United States Patent
Schornack et al.

(10) Patent No.: US 12,314,702 B2
(45) Date of Patent: May 27, 2025

(54) AUTOMATED UPDATE NOTIFICATION OF TASKS TOOL

(71) Applicant: JP Morgan Chase Bank, N.A., New York, NY (US)

(72) Inventors: Laura J. Schornack, Oak Park, IL (US); John R. Dietrich, Darien, IL (US); Patrick Mullen, Westerville, OH (US); Kevin Haas, New Albany, OH (US); Jessica Duggan, New York, NY (US); Radhakrishnan Sethuraman, Aurora, IL (US); Daniel Funchion, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 223 days.

(21) Appl. No.: 18/307,654

(22) Filed: Apr. 26, 2023

(65) Prior Publication Data

US 2024/0362008 A1    Oct. 31, 2024

(51) Int. Cl.
*G06F 8/65* (2018.01)
*G06F 9/54* (2006.01)
*H04L 41/0895* (2022.01)

(52) U.S. Cl.
CPC ............... *G06F 8/65* (2013.01); *G06F 9/542* (2013.01); *H04L 41/0895* (2022.05)

(58) Field of Classification Search
CPC ......... G06F 8/65; G06F 9/542; H04L 41/0895
See application file for complete search history.

(56) References Cited

U.S. PATENT DOCUMENTS

| | | | | |
|---|---|---|---|---|
| 7,574,531 B2* | 8/2009 | Bennett | ........... | H04B 7/18593 709/227 |
| 8,799,413 B2* | 8/2014 | Taylor | ........... | G06F 11/2089 709/219 |
| 8,954,741 B2* | 2/2015 | Suh | ........... | G06F 21/6218 713/171 |
| 9,946,728 B2* | 4/2018 | Chiang | ........... | G06F 3/06 |
| 11,632,355 B2* | 4/2023 | Rajagopalan | ........... | G06F 21/57 726/1 |
| 2012/0101995 A1* | 4/2012 | Agetsuma | ........... | G06F 16/10 707/E17.044 |
| 2015/0106825 A1* | 4/2015 | Abbas | ........... | G06F 9/542 719/318 |

(Continued)

*Primary Examiner* — Douglas M Slachta
(74) *Attorney, Agent, or Firm* — Wood IP LLC; Theodore A. Wood

(57) ABSTRACT

A method for delivering notifications of software deprecations on an external unmanaged cloud environment is provided. The method may be implemented by at least one processor. The method may include gathering data from data sources hosted on an external unmanaged cloud environment but not serviced by the external unmanaged cloud environment; creating a data feed by aggregating the data gathered based on a predetermined criteria; streaming, via a network, the data feed to an internal managed cloud environment; storing the data feed in a data store on the internal managed cloud environment; joining the data feed with internal application data for at least one internal application on the internal managed cloud environment; and creating, based on the joined data, a backlog for delivering the notifications.

20 Claims, 5 Drawing Sheets

(56) References Cited

U.S. PATENT DOCUMENTS

| | | | |
|---|---|---|---|
| 2015/0154211 A1* | 6/2015 | Matsubara | H04L 67/01 |
| | | | 707/812 |
| 2015/0215376 A1* | 7/2015 | Kranz | H04N 21/4431 |
| | | | 709/226 |
| 2019/0235993 A1* | 8/2019 | Modeel | G06F 11/3664 |
| 2021/0024084 A1* | 1/2021 | Kim | H04W 4/40 |
| 2022/0334725 A1* | 10/2022 | Mertes | G06F 3/065 |
| 2023/0089662 A1* | 3/2023 | Wang | G06F 9/5072 |
| | | | 707/827 |

\* cited by examiner

AUTOMATED UPDATE NOTIFICATION OF TASKS TOOL

FIELD OF TECHNOLOGY

The present disclosure generally relates to a mechanism for automatically sending a list of changes and the dates of these changes that are scheduled to occur on an external cloud environment, combining the list of changes with a list of internal applications, and adding notices of the changes to a work backlog tool for each impacted internal applications and methods of using the same.

BACKGROUND

An enterprise, as a cloud service consumer, may acquire and consume resources of an internal cloud environment. When the consumer consumes resources, such as an internal cloud application, the application or product are also provided managed services by the internal cloud environment. In a managed environment, the cloud infrastructure is proactively maintained and monitored on a regular basis to handle tasks, such as managing upgrades and version updates for application dependencies. A dependency is something the application or product needs to function. It can be a plugin, a database, or an external library. Some dependencies may need updates which should be checked regularly. Examples include certificate expiry, license key expiry, and software version hygiene. Otherwise, the application or product can malfunction.

However, when a cloud service consumer migrates to use resources on an unmanaged external cloud environment, many of these managed services are not provided by the hosting provider. The hosting provider manages the hardware side of the infrastructure, but the consumer handles everything related to the software management. The consumer is responsible for installing additional software or updates and security patches, to solve problems or to back up the data on the server.

In an unmanaged cloud environment, updates or upgrades can be released often, and keeping up with them can be challenging. Currently, different teams within an enterprise, such as a financial institution, have the responsibility of tracking and managing these update tasks by manually checking the unmanaged environment to determine whether a new version of an application, an application dependency, or both is available. Unfortunately, no hosting provider vendor currently provides to its unmanaged cloud service customers a feed of such application data, including dependency data, that is scheduled to deprecate along with the dates for when the teams must take action on the deprecation.

Therefore, there is a need for a tool to automatically track and capture expiry data in an external unmanaged cloud environment and feed the expiry data to an internal tool that notifies internal applications that need to make update changes due to the change in expiry data. Thus, there is a need for automatically delivering services to update data sources scheduled to deprecate on an unmanaged cloud environment using a backlog created on the internal managed cloud environment.

SUMMARY

The present disclosure, through one or more of its various aspects, embodiments, and/or specific features or sub-components, provides, inter alia, various systems, servers, devices, methods, media, programs, and platforms for automatically delivering services to update data sources hosted on an external unmanaged cloud environment but not serviced by the external unmanaged cloud environment by gathering data from the data sources and streaming the data in a data feed to an internal managed cloud environment for entry to a backlog for delivering the services. An embodiment provides a system and method for automatically delivering services to update data sources scheduled to deprecate on an unmanaged cloud environment using an internal backlog tool.

An embodiment provides a mechanism for automatically sending a list of changes and the dates of these changes that are scheduled to occur on an external cloud environment. The changes can include, for example, software dependencies, libraries, services, or other features. The list of changes can be combined with a list of internal applications that use these software dependencies, libraries, services, or other features. Notices of the changes can be added to a work backlog tool for each impacted internal application.

Various embodiments provide a method and system for automatically identifying and gathering application data requiring updates in an external unmanaged cloud environment and feeding the update data, such as expiry data, to an internal managed cloud environment for backlog.

According to an aspect of the present disclosure, a method for delivering services to data sources on an unmanaged cloud environment is provided. The method may be implemented by at least one processor. The method may include gathering data from data sources hosted on an external unmanaged cloud environment but not serviced by the external unmanaged cloud environment; generating a data feed by aggregating the data gathered based on a predetermined criteria; streaming, via a network, the data feed to an internal managed cloud environment; storing the data feed in a data store on the internal managed cloud environment; joining the data feed with internal application data for at least one internal application on the internal managed cloud environment; and creating, based on the joined data, a backlog for delivering the services.

The predetermined criteria may include deprecation data comprising a deprecation status indicative of the data sources being unsupported by the external unmanaged cloud environment. The data feed may include at least the deprecation data and one or more attributes to identify the data sources.

In accordance with an exemplary embodiment, the creating the backlog may further comprise adding update or upgrade notifications in the backlog to perform an update or upgrade to the data sources having the deprecation status indicative of being unsupported. The update or upgrade may be the most recent compatible version of the data sources.

In accordance with an exemplary embodiment, the joining may further comprise executing a JOIN operation to combine data of the data feed stored in the data store with the internal application data, based on a Virtual Private Cloud (VPC) attribute identifying which internal application uses this dependency on the external cloud resource being affected by the change.

The data feed may further include one or more expiration attributes to identify at least one of: an expiration date, the expiration date indicating a date when the data source is no longer available; a software version number associated with the expiration date; and a new software version of the data source at the external unmanaged cloud environment.

The data sources may comprise one or more applications. The external unmanaged cloud environment may include a VPC and one or more containers. The VPC may host the one or more containers, and the one or more containers may run the one or more applications.

The data feed may further include additional attributes to identify at least one of: the one or more applications; the VPC; the one or more containers; an Internet Protocol (IP) address; a container namespace; and an application dependency, wherein the application dependency may include any data on which the one or more applications depend.

In accordance with an exemplary embodiment, the joining may further comprise executing a JOIN operation to combine data of the data feed stored in the data store with the internal application data based on an VPC attribute identifying the VPC on the external unmanaged cloud environment.

In accordance with an exemplary embodiment, the creating the backlog may further comprise adding update or upgrade notifications in the backlog to perform an update or upgrade to the data sources having the deprecation status indicative of being unsupported by the external unmanaged cloud environment; and prioritizing the updating or the upgrading notifications in the backlog. The update or the upgrade may comprise updating or upgrading at least the application dependency including at least one of a library update, a certificate update and a license update.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As described herein, various embodiments provide optimized methods and systems for automatically identifying and gathering application data requiring updates in an external unmanaged cloud environment and feeding the update data, such as expiry data, to an internal managed cloud environment for backlog.

Figure 1:
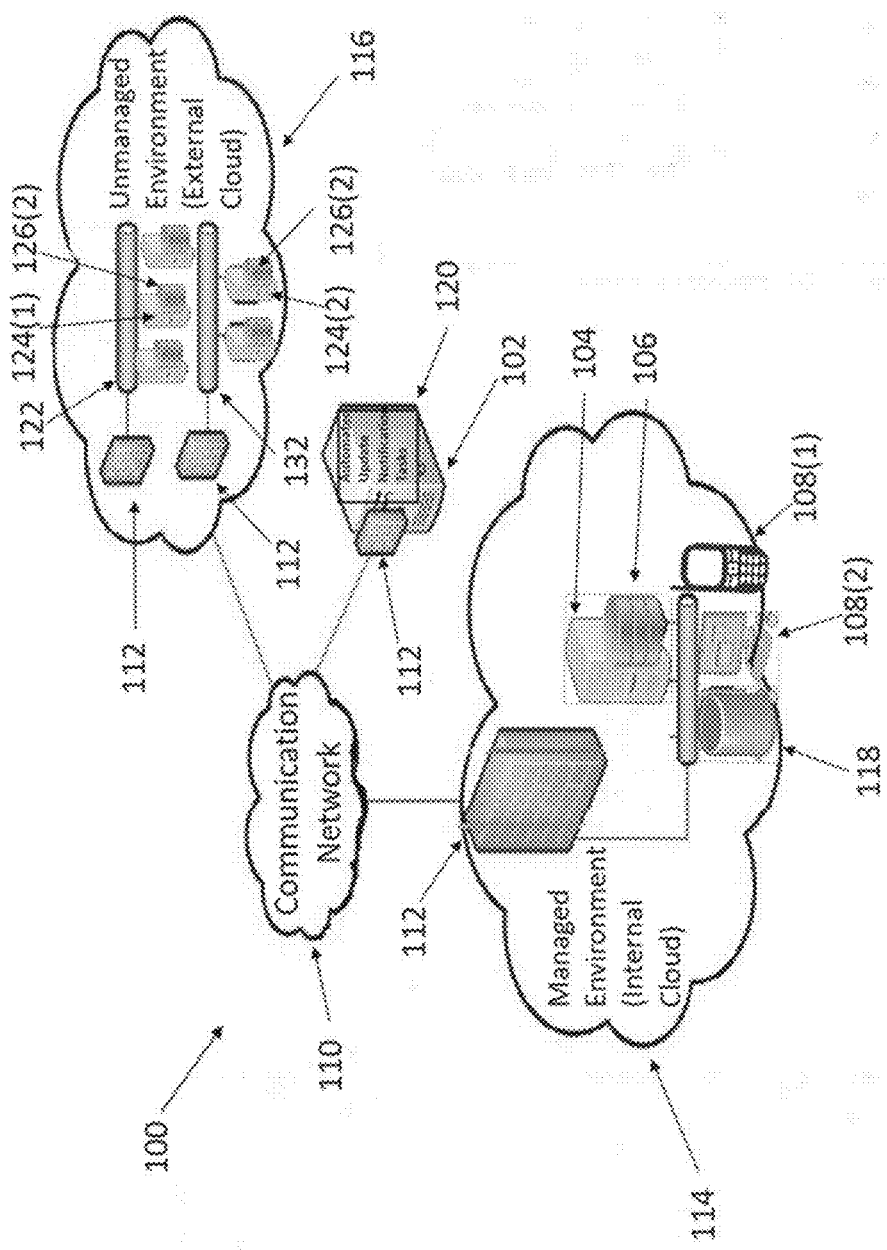
FIG. 1 shows an exemplary system for implementing a method for automatically delivering services to update data sources on an unmanaged cloud environment.

Referring to FIG. 1, a schematic of an exemplary network environment 100 for implementing a method for automatically gathering update data from an external unmanaged cloud environment is illustrated. The update data may be fed to an internal managed cloud environment for backlog. In an exemplary embodiment, the method is executable on any networked computer platform, such as, for example, a personal computer (PC).

As shown in FIG. 1, the network environment 100 includes an Automatic Update Notification Tasks (AUNT) tool 102, a communication network 110, an internal managed cloud environment 114, and an external unmanaged cloud environment 116. In some embodiments, the internally managed cloud environment 114 is connected to the external unmanaged cloud environment 116 through a network, such as a communication network 110, for example.

The method for automatically gathering application update data from an external unmanaged cloud environment and feeding the gathered data to an internal managed cloud environment for backlog may be implemented by the AUNT tool 102. The AUNT tool 102 may be a computer system. The AUNT tool 102 may store one or more applications that can include executable instructions that, when executed by the AUNT tool 102, cause the AUNT tool 102 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AUNT tool 102 itself, may be located in virtual server(s) running in a cloud-based computing environment rather than being tied to one or more specific physical network computing devices. Also, the application(s) may be running in one or more virtual machines (VMs) executing on the AUNT tool 102. Additionally, VMs running on the AUNT tool 102 may be managed or supervised by a hypervisor.

As used herein, an internally managed cloud environment 114 may include a private cloud computing platform operated by a single entity for use by the single entity. The internal cloud computing platform may communicate with and transfer data between the internal cloud computing platform, other internal cloud computing platforms, and third-party external cloud computing platforms. In another exemplary embodiment, the internal cloud computing platform may utilize computing architectures similar to external cloud computing platforms. However, the internal cloud computing platform may not provide services such as, for example, data processing and data storage services for third-party entities. In another exemplary embodiment, the internal cloud computing platform may utilize proprietary computing architectures developed by the operating entity.

Internal managed cloud environment 114 may provide managed services that includes, for example, remote monitoring, automated routine tasks such as configurations and software upgrades, an asset management database, and handling of tasks. For instance, in internally managed cloud environment 114, the cloud infrastructure is proactively maintained and monitored on a regular basis to handle tasks, such as managing upgrades and version updates for application dependencies. The managed services can be provided using a combination of human and artificial intelligence working together to monitor devices and maintain all hardware and software in use, while simultaneously identifying potential problems and addressing them before they can cause a negative impact to the system.

In FIG. 1, external unmanaged cloud environment 116 may include an external application that is maintained in an external cloud computing platform and generated by using a content management platform. The external cloud computing platform may include a third-party cloud computing platform such as, for example, an AMAZON Web Services (AWS) cloud computing platform, a GOOGLE Cloud platform, and a MICROSOFT AZURE cloud computing platform that provides on-demand computer system resources via a network 110 such as, for example, the Internet.

In some embodiments, external unmanaged cloud environment 116 may include communication devices 124, 126 connected to the network 110. The communication devices may be grouped together to form distinct private networks 122, 132, respectively within the external unmanaged cloud environment 116. Private network 122 and private network 132 may be logically isolated virtual networks that are isolated from each other. Private network 122 and private network 132 may be associated with the same entity or different entities. Private network 122 may include communication devices 124(1), 126(1).

Private network 132 may include communication devices 124(2), 126(2). In some embodiments, the communication devices may take the form of servers, general purpose computers, mainframe computers, or the like. In some embodiments, the communication devices may take the form of mobile computing devices such as smartphones, tablets, laptop computers or the like. Alternatively, the communication devices may be configured as particular apparatus, embedded systems, dedicated circuits, or the like, based on the storage, execution, and/or implementation of the software instructions that perform operations consistent with the disclosed embodiments.

In the example of FIG. 1, a user, such as a financial institution of internal managed cloud environment 114, can migrate and join external unmanaged cloud environment 116 as a customer to access the resources, services, and data provided by the external unmanaged cloud environment 116. Such a configuration can establish a cloud-to-cloud migration. However, many of the managed services provided on the internal managed cloud environment 114 are not provided to the user by the hosting provider of the external unmanaged cloud environment 116.

In comparison, for example, a well-managed environment is up to date with all versions of dependencies in the environment and is aware of what needs to be upgraded and when for all components. Managed-cloud service providers include a service layer on top of their infrastructure. Therefore, a managed environment provides support roles to manage version updates for application dependencies. In contrast, in the unmanaged delivery model, infrastructure resources are provided to cloud consumers and availability levels do not go beyond that layer. Therefore, an unmanaged environment does not provide support roles to manage version updates for dependencies.

As an example, at some point, all software becomes deprecated as new versions are released and older ones are no longer supported. When a new version is released, an expiration date is announced for the previous version. A version is considered deprecated once its expiration date has been announced. Example of products on the external unmanaged cloud environment 116 that may be scheduled for deprecation include a library dependency, a license, or a certificate that needs to be updated. Unfortunately, no hosting provider currently provides a service to its customers of streaming a data feed of products scheduled for deprecation and the dates the products are set to deprecate.

Rather, current conventional practices typically rely on a manual process performed piece by piece in the industry, which is extremely time-consuming. Traditionally, different teams from an internal managed cloud environment must manually scan, on an external unmanaged cloud environment, a variety of sources, such as the websites and the websites of the software companies that have software running in the unmanaged external cloud environment, to research, identify, and collect all the scheduled update changes affecting a client's private network on the external unmanaged cloud environment.

The system and method of the present disclosure eliminates the conventional approach of manual mining of this update data to keep the customer's external environment applications up to date. Instead, the embodiments implement an automated update notification of tasks tool that proactively monitors updates required in an external unmanaged cloud environment and feeds the updates to an internal managed cloud environment. The method for automatically gathering application data from an external unmanaged cloud environment and feeding the gathered data to an internal managed cloud environment for backlog may be implemented by the AUNT tool 102.

Thus, one solution discussed herein is to provide a proactive and predictive approach that gathers all update data, such as expiry data, from the unmanaged environments, and streams the expiry data, via an automatic data feed, to the internal managed environment. The expiry data is aggregated into a common data source, the joined and matched to the data of the internal managed environment during the intake process to identify the correct application teams. A list is generated of the expiry data from which the teams of the internal managed environments can pull the information for the automated creation of backlog issues. The backlog contains outstanding issues for a team to work on. The backlog can be configured as a dedicated space for defining and prioritizing issues the team will work on now and into the future. The backlog can be used to plan work in advance so that the team members can quickly handle the most important tasks based on priority.

In FIG. 1, the system and method sets up a process to bring the update of the expiry data found in the external unmanaged cloud environment 116 into the development backlog of the internal managed cloud environment 114 and assigns them a priority. During the intake process, a common data store 118 can be used to store the incoming feed data. Through the use of the data repository and query functions of data store 118, the data store 118 can be leveraged to analyze the feed data to identify what additional work is necessary for customers of the external unmanaged cloud environment 116. That work may be injected into backlogs on the internal managed cloud environment 114.

Data store 118 may be a digital repository for persistently storing and managing collections of data. Persistent storage is nonvolatile, which means the storage retains the data even after a device's power is turned off. Data store 118 can be used to store data from different systems and to process and organize the data in different formats. The data store 118 can query the data feed to provide real-time reporting. Data store 118 can be configured to accept data continuously in real-time, periodically, or through batch processing. Preferably, data store 118 is configured to process the update data of the data feed continuously such a report can be generated any day at any time and provide accurate up-to-date information.

In some embodiments, the data store 118 may be a data repository configured as an enterprise data storage entity into which data has been specifically isolated to be mined for data reporting and analysis. The primary benefit of the data repository is the case of reporting or analysis of the expiry data due to isolation from other data. In various embodiments, the data store 118 can be implemented in a private network or a public network.

An exemplary embodiment of the present invention may be applied to JIRA projects. The intake of the data feed information stored in data store 118 may be analyzed (described below) and an automated issue tracking application, such as JIRA, can identify the plurality of tasks for backlog. A backlog lists issues or tasks that a team plans to work on, as well as issues or tasks currently being worked on. JIRA is an example of an issue tracking system that provides bug tracking, issue tracking and project management functions. The JIRA issues track each piece of work that needs to pass through the workflow steps to completion. When using Jira, the planning, structuring, executing, and monitoring tasks, and their progress, are carried out by elements called epics, stories and tasks. An epic refers to a large project that can be broken into a number of smaller stories or issues. A story is the smallest unit of work that needs to be done. A task represents work that needs to be done. A subtask is a single piece of work that is required to complete a task.

The backlog created on the internal managed cloud environment 114. Then, the backlog can be used to plan work on the data sources identified as deprecated on the external unmanaged cloud environment 116 in advance so that the teams can quickly work on the most important tasks before the expiration date occurs. Therefore, an embodiment provides a system and method for automatically delivering services to update data sources scheduled to deprecate on an unmanaged cloud environment using a backlog created on the internal managed cloud environment.

In an embodiment, tracking and resolving issues (referred to herein as tickets) may include using an issue tracking tool. The ticket typically reports a problem or issue. The issue tracking tool manages and analyzes the tickets to identify resolution(s) relevant to the problem. The issue tracking tool can automatically add the relevant resolutions to each ticket. The issue tracking tool may be a tool similar to JIRA. JIRA tickets, for example, can be used to identify and update data sources scheduled to deprecate on an unmanaged cloud environment using a backlog created on the internal managed cloud environment.

An embodiment enables data from multiple sources to automatically merge for analysis and machine learning in a cloud services platform. An embodiment of the present invention may be applied to various businesses, such as a financial institution, by establishing a page application. Data may be provisioned from an external cloud services platform to a data source. Thus, an embodiment of the present invention may provide a results page. In an exemplary results page, application logs pertaining to a particular action thread may be refreshed periodically. For example, a data feed file may be downloaded to a local file system of the data source, which may include logs from other threads if running in parallel. The migration log file may be attached to a JIRA ticket.

Various embodiments can be implemented using applications written in a programming language, such as a JAVA program, capable of executing cloud-based programming. The JAVA program can interact with JIRA.

In some embodiments, the page application queries the data source (i.e., database) to identify new tasks that have been pulled into, for example, the JAVA program and determine if the dates and timeframes are appropriate for the JIRA tickets to be created at that time. This backlog analysis of the JIRA tickets enables an agile team or a project manager to perform cost and time analysis to measure the cost and time needed to complete all the work.

A scrum team, which consists of a project manager, a scrum master, and the development team, is typically a small group that works together and is responsible for developing a product. However, as scrum teams are now being asked to handle the additional responsibility of managing their own environments, the AUNT tool 102 provides visibility into all the work previously completed by specialized environment management teams. Rather than being reactive, where a ticket is submitted to update an application after a malfunction has occurred and then the team works to resolve the ticket, the AUNT tool 102 is proactive. The AUNT tool 102 monitors and periodically checks software for potential expiration problems and makes the necessary updates before an application malfunction even has time to occur (with or without human interaction).

Thus, one of the outcomes of the embodiments will be a deliberate means to ensure each team is working on the correct task for the right purpose suited for the team's specific needs. The embodiments can provide a fully, managed purpose-built database that takes into consideration expiry data that needs to be brought together from disparate sources. Another outcome is to ensure that product owners have a clear line-of-sight into the technology-oriented deliverables.

In the example of FIG. 1, the communication device 124(1) can be a server device. The AUNT tool 102 can be coupled to a plurality of server devices 104, 124(1) that hosts a plurality of databases 106 and to a plurality of client devices 108 via communication network(s) 110. The server device 104 and database 106 may be implemented in the internal managed cloud environment 114. Communication devices 124(1), 126(1) may be implemented in a client's private network 122 in the external unmanaged cloud environment 116. The client's private network 122 can be associated with an entity of or coupled with components of internal managed cloud environment 114.

The client's private network 122 can be isolated from private network 132, which can be associated with a different entity. The client's private network 122 may be configured as a VPC that provides the client full control over its virtual networking environment, including resource placement, connectivity, and security. Accordingly, the resources can be defined and launched in a logically isolated private network 122. Various embodiments can include one or more VPCs.

Firewalls 112 can be provided to prevent unauthorized access to and from private networks 122, 132 or internal managed cloud environment 114. Firewalls 112 can be implemented in both hardware and software, or a combination of both. A communication interface of the AUNT tool 102 operatively couples and communicates between the AUNT tool 102, the server devices 104, 124(1), and/or the client devices 108. These devices are all coupled together by the communication network(s) 110, although other types and/or numbers of communication networks or systems with other types and/or numbers of connections and/or configurations to other devices and/or elements may be used.

The AUNT tool 102, the server devices 104, 124(1), and/or the client devices 108 may be coupled together via other topologies. Additionally, the network environment 100 may include other network devices such as one or more routers and/or switches, for example, which are well known in the art and thus will not be described herein. This technology provides several advantages including methods, non-transitory computer readable media, and AUNT tools 102 that efficiently implement a method for automatically gathering expiry data from an external unmanaged cloud environment 116 and feeding the expiry data to an internal managed cloud environment 114 for backlog.

By way of example only, the communication network(s) 110 may include local area network(s) (LAN(s)) or wide area network(s) (WAN(s)) and can use Transmission Control Protocol/Internet Protocol (TCP/IP) over Ethernet and industry-standard protocols, although other types and/or numbers of protocols and/or communication networks may be used. The communication network(s) 110 may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AUNT tool 102 may be a standalone device or integrated with one or more other devices or apparatuses, such as one or more of the server devices 104, 124(1), for example. In one particular example, the AUNT tool 102 may include or be hosted by one of the server devices 104, 124(1), and other arrangements are also possible. Moreover, one or more of the devices of the AUNT tool 102 may be in the same or a different communication network including one or more public, private, or cloud networks, for example.

The plurality of server devices 104, 124(1) may be a computer system or a computer device, including any features or combination of features described with respect thereto. For example, any of the server devices 104, 124(1) may include, among other features, one or more processors, a memory, and a communication interface, which are coupled together by a bus or other communication link, although other numbers and/or types of network devices may be used. The server devices 104, 124(1) in this example may process requests received from the AUNT tool 102 via the communication network(s) 110 according to the HTTP-based and/or JavaScript Object Notation (JSON) protocol, for example, although other protocols may also be used.

The server devices 104, 124(1) may be hardware or software or may represent a system with multiple servers in a pool, which may include internal or external networks. The server devices 104, 124(1) hosts the databases 106 that are configured to store data that relates to application data, data sets, download information, administrative information, and log usage forms.

Although, the server devices 104, 124(1) are illustrated as single devices, one or more actions of each of the server devices 104, 124(1) may be distributed across one or more distinct network computing devices that together comprise one or more of the server devices 104, 124(1). Moreover, the server devices 104, 124(1) are not limited to a particular configuration. Thus, the server devices 104, 124(1) may contain a plurality of network computing devices that operate using a master/slave approach, whereby one of the network computing devices of the server devices 104, 124(1) operates to manage and/or otherwise coordinate operations of the other network computing devices.

The server devices 104, 124(1) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 108 may also be a computer system or a computer device, including any features or combination of features described with respect thereto. For example, the client devices 108 in this example may include any type of computing device that can interact with the AUNT tool 102 via communication network(s) 110. Accordingly, the client devices 108 may be mobile computing devices, desktop computing devices, laptop computing devices, tablet computing devices, VMs (including cloud-based computers), or the like, that host chat, e-mail, or voice-to-text applications, for example. At least one client device 108(1) is a wireless mobile communication device, i.e., a smart phone.

The client devices 108 may run interface applications, such as standard web browsers or standalone client applications, which may provide an interface to communicate with the AUNT tool 102 via the communication network(s) 110 to communicate user requests and information. The client devices 108 may also include a display device, such as a display screen or touchscreen, and/or an input device, such as a keyboard.

Although the exemplary network environment 100 with the AUNT tool 102, the server devices 104, 124, the client devices 108, and the communication network(s) 110 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 100, such as the AUNT tool 102, the server devices 104, 124(1), or the client devices 108 may be configured to operate as virtual instances on the same physical machine. In other words, one or more of the AUNT tool 102, the server devices 104, 124(1), or the client devices 108 may operate on the same physical device rather than as separate devices communicating through communication network(s) 110. Additionally, there may be more or fewer AUNT tools 102, server devices 104, 124(1), or client devices 108 than illustrated in FIG. 1.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, PDNs, the Internet, intranets, and combinations thereof.

The AUNT tool 102 is described and shown in FIG. 1 as including an automatic update notification module 120, although it may include other rules, policies, modules, databases, or applications, for example. As will be described below, the automatic update notification module 120 is configured to implement a method for automatically gathering update data (e.g., expiry data) from the external unmanaged cloud environment 116 and feeding the update data to the internal managed cloud environment 114 for backlog.

An exemplary process for implementing a mechanism for automatically gathering the update data from an external unmanaged cloud environment 116 and feeding the update data to an internal managed cloud environment 114 for backlog by utilizing the network environment 100 of FIG. 1. Specifically, a first client device 108(1) and second client devices 108(2) may be in communication with AUNT tool 102. In this regard, the first client device 108(1) and the second client devices 108(2) may be "clients" of the AUNT tool 102 and are described herein as such. Nevertheless, it is to be known and understood that the first client device 108(1) and/or the second client devices 108(2) need not necessarily be "clients" of the AUNT tool 102, or any entity described in association therewith herein. Any additional or alternative relationship may exist between either or both of the first client device 108(1) and the second client devices 108(2) and the AUNT tool 102, or no relationship may exist.

Further, in an embodiment, AUNT tool 102 can be configured to access an external cloud computing platform repository in an external unmanaged cloud environment 116 and an internal cloud computing platform database in an internal managed cloud environment 114. The automatic update notification module 120 may be configured to access these databases for implementing a method for automatically gathering expiry data from an external unmanaged cloud environment 116 and feeding the expiry data to an internal managed cloud environment 114 for backlog.

The first client device 108(1) may be, for example, a smart phone. Of course, the first client device 108(1) may be any additional device described herein. The second client devices 108(2) may be, for example, a PC. Of course, the second client devices 108(2) may also be any additional device described herein.

The process may be executed via the communication network(s) 110, which may comprise plural networks as described above. For example, in an exemplary embodiment, either or both of the first client device 108(1) and the second client devices 108(2) may communicate with the AUNT tool 102 via broadband or cellular communication. Of course, these embodiments are merely exemplary and are not limiting or exhaustive.

Upon execution, the automatic update notification module 120 executes a process for automatically gathering expiry data from an external unmanaged cloud environment 116 and feeding the expiry data to an internal managed cloud environment 114 for backlog. An exemplary process for automatically gathering expiry data from an external unmanaged cloud environment 116 and feeding the expiry data to an internal managed cloud environment 114 for backlog is generally indicated at method 200 in FIG. 2.

Figure 2:
FIG. 2 is a flowchart of an exemplary process for implementing a method for automatically delivering services to update data sources on an unmanaged cloud environment.

FIG. 2 is a flowchart of an exemplary method 200 for implementing an AUNT tool 102. In general, the method 200 gathers all expiry data from the unmanaged environments, streams the expiry data via an automatic data feed to the internal managed environment. The expiry data is aggregated in the data feed into a common data store, then joined and matched to application data of the internal managed environment. This process identifies the correct application teams and generates a list of the expiry data from which the teams of the internal managed environments can pull the information for the automated creation of backlog issues.

While the method 200 of FIG. 2 illustrates certain operations performed in a particular order, it should be understood that the embodiments of the present invention may be practiced by adding one or more operations to the processes, omitting operations within the processes and/or altering the order in which one or more operations are performed. The operations of FIG. 2 are explained in further detail below.

Figure 4:
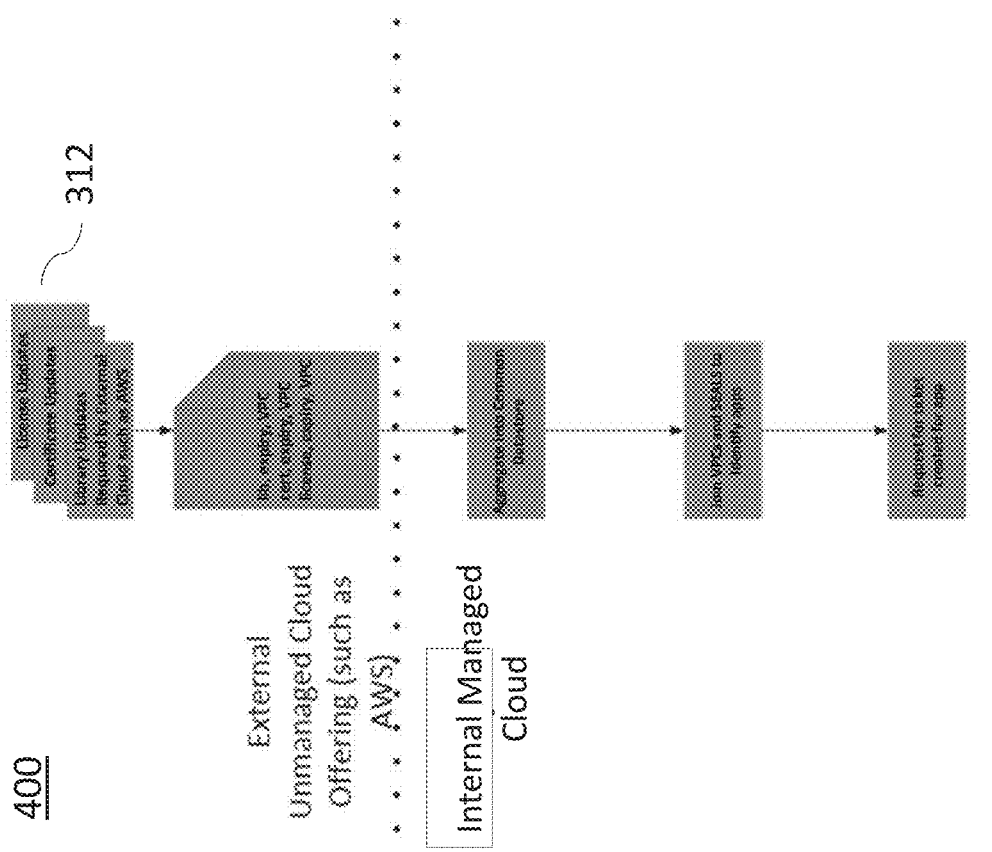
FIG. 4 is a diagram that illustrates a process flow usable for implementing a method for automatically delivering services to update data sources on an unmanaged cloud environment, according to an exemplary embodiment.
Figure 5:
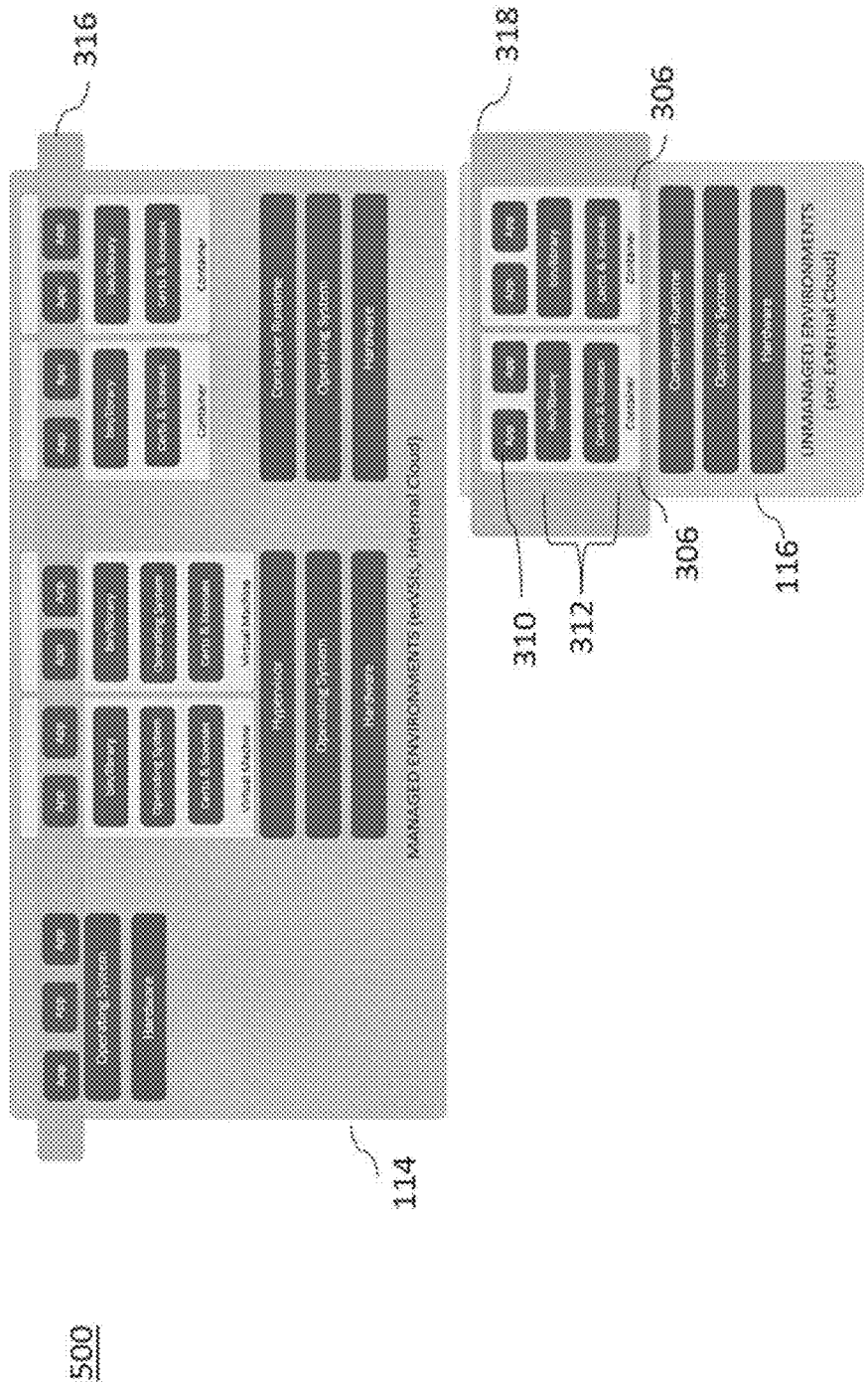
FIG. 5 is an exemplary diagram of a system that is usable for implementing a method for automatically delivering services to update data sources on an unmanaged cloud environment, according to an exemplary embodiment.

At block 210, data may be gathered from a variety of sources that are identified as containing a scheduled update that will affect a client's private network 122 on the external unmanaged cloud environment 116. The update data may include, for example, expiry data, which has a scheduled "an end date" in the external unmanaged cloud environment 116. An application 310, its dependencies 312, or both may need regular updates. Failure to update them can cause the product to malfunction. Example application updates may include application dependencies 312, such as license updates, certificate updates, and library updates required by the external cloud, as illustrated in FIGS. 4-5. For example, as discussed above, all software eventually becomes deprecated as new versions are released and older ones are no longer supported. When a new version is released, an expiration date is announced for the previous version. A version is considered deprecated once the expiration date has been announced for it. Another example is that digital certificates may contain an expiry date because they have a defined lifetime. To continue use of these certificates, they need to be renewed before they expire. A certificate that is not renewed expires, which can lead to a website or an application being unavailable.

Figure 3:
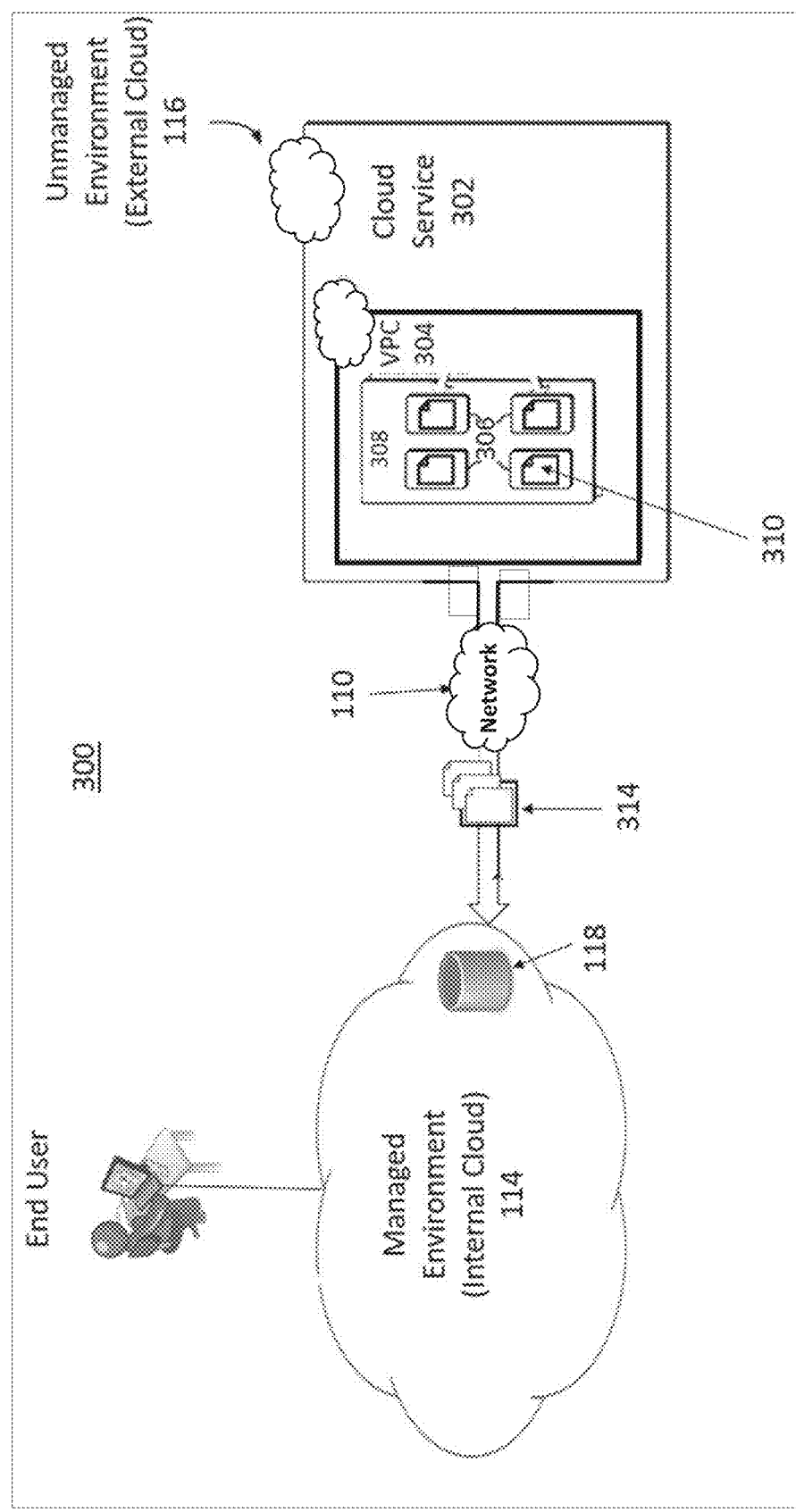
FIG. 3 is an example of a container application implemented in the cloud computing environment for implementing a method for automatically delivering services to update data sources on an unmanaged cloud environment.

For instance, when implementing the method 200 in a cloud computing environment 300, as illustrated in FIGS. 3-5, data can be gathered from one or more components of the external unmanaged cloud environment 116, hosted in a public or private cloud, examples of which are service such as AWS, Microsoft Azure Cloud, and OpenStack. These cloud providers can provide isolated network domains (for example Amazon EC2 (Elastic Compute Cloud) "virtual private cloud 304) which can be isolated or connected with other VPCs or datacenter networks using virtual routers. The VPC 304 provides a logically isolated area of the AWS cloud where the customer can launch AWS resources in a virtual network that the customer defines.

FIG. 3 illustrates a container application implemented in the cloud computing environment 300 according to various exemplary embodiments of the present teachings. The underlying hardware (non-limiting examples: processors, hard drives, solid-state memory, random access memory (RAM), etc.) on which the components of the external unmanaged cloud environment 116 execute can be shared by multiple customers or tenants as part of the shared computing resource environment. In addition, when implemented in a shared computing resource environment as a cloud-based service 302, various components can be implemented using containerization or operating-system-level virtualization, or other virtualization techniques. For example, one or more components can be implemented as separate software containers or container instances.

These software containers, also referred to simply as "containers 306" are lightweight, virtualized execution environments for applications that package an application 310 (FIGS. 3 and 5) in its own complete file system that contains everything the application 310 needs to run, including one or more programs, data, application code, and any application dependencies 312 (e.g., libraries, files, etc.) (FIG. 5). Application dependencies 312 include the source code package that the application code relies on, a language runtime for interpreted languages, and binary packages that the dynamically linked code relies on. The logical container 306 stores an object, which may include any type of data.

When the container 306 is run (or executed), the running program (i.e., the process) is isolated from other processes running in the same computer system instance. Thus, containers 306 may each run on an operating system (e.g., using memory, CPU, and storage allocated by the operating system) of the container instance 308 and execute in isolation from each other (e.g., each container may have an isolated view of the file system of the operating system).

In a container application, each container requires a unique IP address. Each of the containers 306 may have its own namespace, and applications 310 running within the containers are isolated by only having access to resources available within the container namespace.

The data sources can be an application, a program, or a system. Therefore, in block 210, the update data, (e.g., expiry data) can be gathered from a variety of identified sources, including, but are not limited to, containers (e.g., container images, deployed and executing container instances, etc.), virtual machines, workloads, applications, processes, physical machines, compute nodes, clusters of compute nodes, software runtime environments (e.g., container runtime environments), and/or any other virtual and/or physical compute resource that may reside in and/or be executed by one or more computer resources in external unmanaged cloud environment 116. As illustrated in FIGS. 4-5, example expiry data can include data of application dependencies 312, for example, certificate expiry data, license key expiry data, and software version hygiene expiry data.

At block 220, a data feed may be generated by consolidating the update data obtained from the various identified data sources. The data feed is a mechanism for delivering data streams of up-to-date information from external unmanaged cloud environment 116 to the internal managed cloud environment 114 automatically or on demand. The data feeds may be generated on a periodic basis such as, for example, on a daily or weekly basis. The data feeds may also be generated dynamically by an application of a data source. In some embodiments such as the exemplary embodiment of FIG. 3, the internal managed cloud environment 114 may be optional, because the backlog tool may not be included within the internal managed cloud environment 114.

In the present disclosure, the data feeds can be defined in any file format that the client application understands. The data feed file criteria may specify data to be included in a data feed file 314. A data feed file 314 can be populated with data based on the criteria of expiry data. For example, the data feed file 314 may include a complete list of all software which are installed on the entity's VPCs 304 and software identifying attributes. The software identifying attribute provides information to help identify the software requiring updates or upgrades.

Example software identifying attribute information that may be retrieved includes the name of the software application, the version number of the application, a license identification number, a start date, an expiration date, a deprecation date, a VPC identity, a library file name, a status identifier, and a vendor name. The data feed may also include supplemental identifying attribute information such as, for example, IP address, namespace and virtual machine, container identifier, hostname, virtual private network (VPN) identity, repository, or other identifying information.

In block 230, after the data feed file 314 has been populated, the data feed may be transferred in the form of data streams from external unmanaged cloud environment 116 to the internal managed cloud environment 114 automatically or on demand. The data feed may be transferred continuously in real-time or near real-time, periodically, or in batches to the internal managed cloud environment 114. FIG. 3 illustrates how a continuous data feed of data feed files 314 may be received at the internal managed cloud environment 114 and stored in a common data store 118 (FIGS. 1 and 3).

In block 240, during the intake process, the continuous stream of data feed files 314 along with the software identifying attribute information may be aggregated and stored into the common data store 118 implemented on the internal managed cloud environment 114. The data feed may include a plurality of different data sets. As each dataset is received, the common data store 118 is updated accordingly. The common data store 118 can be leveraged to identify what additional work is necessary for customers of the external unmanaged cloud environment 116. That work may be injected into development team backlogs.

To build and configure the common data store 118 that generates the list of expiry data, in various embodiments, a software application can be used to provide an interface for users to define, create, query, update, or administer the data store 118.

In block 250, after the common data store 118 has been built and the data feed stored therein, a JOIN operation may be performed on the data store 118, enabling data from the data store 118 and data of the internal managed cloud environment 114 to be combined based on a common attribute between them. Data from the data store 118 and application data of the internal managed cloud environment 114 can be combined to determine relationships between the data, run queries, and perform advanced analytics. The JOIN operation combines data from the data store 118 and application data of the internal managed cloud environment 114 on a join condition using an attribute that exist in both data. In some embodiments, the JOIN operation may involve more than two sets of data.

In some embodiments, the common attribute can be defined, for example, as the VPCs 304 on the external unmanaged cloud environment 116. The data from the data store 118 based on the attribute of the VPC identity data can be joined and matched with an identification number application that maintains a list of software, the versions and the depreciation data indicating when the software will be depreciated on the internal managed cloud environment 114. The identification number application is an internal tool that assigns an identification number to every application to track and monitor each application throughout the process. A common attribute other than the VPCs may be used as the join condition.

In this example, the combined table or list resulting from the join operation links the VPCs with the application that uses them. Namely, the process can analyze the incoming data feed to determine the software that is running on each VPC 304 in the external unmanaged cloud environment 116 and match the software to the application teams that are using the software and put the software and the update information (e.g., expiry data) into the team's backlog. Results derived from joining the data feed received from the external unmanaged cloud environment 116 and the data of the internal managed environment 114 can be used to identify the correct application teams and generate a list of the expiry data from which the teams of the internal managed environments 114 can select and pull the information for the automated creation of backlog issues.

At block 260, the backlog may be created using the results derived from the JOIN operation. The backlog contains a list of tasks for a team to work on in a project. An exemplary embodiment of the present invention may be applied to JIRA projects. Creating the list of tasks for the backlog can be implemented, for example, in the form of standard JIRA Epics.

For instance, an embodiment of the present disclosure may create the necessary epic and associated stories (with sub-tasks) into JIRA for updates to depreciating applications on an external network. Tasks that must be completed for the updates may be entered into a JIRA platform according to a defined priority to create the list of tasks. The list of tasks may be ranked according to priority. In some embodiments, the prioritized list of tasks in the backlog may be assigned to a development team, tracked and closed for completion. In some embodiments, the development team may pull work from the product backlog as there is capacity for it, either continually or by iteration.

JIRA projects are merely one example. The embodiments, however, may be applied to various issue tracking systems and other systems. For example, an issue tracking tool may be configured to manage issues and create the backlog tickets.

FIG. 4 is a diagram that illustrates a process flow 400 usable for implementing a method for automatically gathering application data from an external unmanaged cloud environment such as, for example, an AWS cloud platform and feeding a data feed of the gathered data to an internal managed cloud environment for backlog, according to an exemplary embodiment. The process flow 400 may provide for a data gathering and data feeding mechanism that may be located in virtual server(s) running in a cloud-based computing environment or may be tied to one or more specific physical network computing devices.

As illustrated in FIG. 4, the process flow 400 begins with the execution of the AUNT tool 102 containing memory storing executable instructions to cause a processor to gather data from a variety of sources that include one or more software applications, the software application dependencies, or both, which are identified as needing an update or upgrade that will affect a client's network on the external unmanaged cloud environment. The processor can identify and gather data regarding any software products scheduled to deprecate or any product that should be updated or upgraded. Example updates for the software application may include license updates, certificate updates, and library updates required by the external cloud.

In turn, a data feed may be generated by consolidating the update data obtained from the various identified data sources. The data feed file can be populated with the gathered data based on the criteria of expiry data. For example, the data feed file may include a complete list of all software which are installed on the entity's VPCs on the external unmanaged cloud environment and software identifying attributes.

After the data feed file has been populated, the data feed may be transferred in the form of data streams from the external unmanaged cloud environment to the internal managed cloud environment automatically or on demand. Once the data feed file is received internally at the internal managed cloud environment, during the intake process, the continuous stream of data feed files along with the software identifying attribute information may be aggregated and stored into the common data store implemented on the internal managed cloud environment.

Then, a JOIN operation may be performed on the data store, enabling data from the data store and data of the internal managed cloud environment to be combined based on a common attribute between them. The data from the data store based on the attribute of the VPC identity data can be joined and matched with an identification number application that maintains a list of software, the versions and the depreciation data indicating when the software will be depreciated on the internal managed cloud environment. The identification number application is an internal tool that assigns an identification number to every application to track and monitor each application throughout the process.

Results derived from joining the data feed received from the external unmanaged cloud environment and the data of the internal managed environment can be used to identify the correct application teams and generate a list of the expiry data from which the teams of the internal managed environments can select and pull the information for the automated creation of backlog issues.

FIG. 5 is an exemplary system 500 for assisting with responsibilities typically handled by an agile team operating in a cloud computing environment, such as the network environment 100. An internally managed cloud environment 114 can be connected to an external unmanaged cloud environment 116 through a network, such as a communication network 110, for example. The system 500 provides proactive managed services that monitors devices and maintain hardware and software in use, while simultaneously identifying potential problems and addressing them before they can cause a negative impact for customers. In some embodiment, the system 500 uses a combination of human and artificial intelligence working together to provide the proactive managed services.

The system 500 is usable for implementing a method for automatically gathering data from an external unmanaged cloud environment 116 into a data feed, which is streamed to an internal managed cloud environment 114 for prioritizing the data for backlog. Thus, system 500 proactively monitors and identifies data on the external unmanaged cloud environment 116 and automatically feeds the data to the internal managed cloud environment 114 for analysis to prioritize and update the data in a team's backlog for resolution. Thus, the managed services provided on the managed environment are automated by using AUNT tool 102 to proactively resolve issues within the unmanaged environment. For example, the managed services provided by system 500 can include updating and upgrading software applications that are identified as deprecated by the external unmanaged cloud environment 116.

Some of the software management responsibilities associated with the agent team that can be implemented by AUNT tool 102 can include managing and updating the applications indicated in application 316, on the internal managed cloud environment 114. In comparison, in the external unmanaged cloud environment 116, the agent team is responsible for managing and updating the entire content of each container 306 from a variety of sources indicated in application 318. Each container 306 contains everything application 310 needs to run, including one or more programs, data, application code, and any application dependencies 312 (e.g., libraries, files, etc.) (FIGS. 4-5). Application dependencies 312 include the source code package that the application code relies on, a language runtime for interpreted languages, and binary packages that the dynamically linked code relies on. By managing the entire container 306, the AUNT tool 102 can be configured to automatically perform numerous tasks that several teams performed manually in the past.

The data from a variety of applications 318 in the external unmanaged cloud environment 116 can be feed to the internal managed cloud environment 114, matched to the appropriate internal application 316, and used to generate a list of the expiry data from which the teams of the internal managed environments can pull the information for the automated creation of backlog issues.

The solution of the present disclosure provides an approach implemented by system 500 that gathers data to discover the teams that are currently supporting managed environments, and all the systems they use to track updates and the adjacent teams they need to interact with. The system 500 also identifies the databases that store all this information.

In some embodiments, the system 500 implements Agile methodology within an organization, such as a large financial institution. An embodiment of the present invention may provide Agile integration. Agile integration may represent an approach that allows microservices to be updated without disrupting other services. Agile software development may generally refer to software development methodologies focused on iterative development, where requirements and solutions may evolve through collaboration between self-organizing cross-functional teams. For example, the AUNT tool 102 may issue instructions to create the necessary epic and associated stories (with sub-tasks) into JIRA for updates on the external unmanaged cloud environment 116. Tasks that must be completed for updates may be entered into a JIRA platform so they may be assigned to individual software developers, tracked, and closed for completion.

In large enterprises teams can operate with numerous members from different teams managing one or more systems. Using the AUNT tool 102 in the agile approach, the system 500 assists with the socialization and awareness of the work each team is performing along with alignments to adjacent initiatives to address the challenges that large organizations may face with many different processes and tools that have been deployed. The system 500 facilitates alignment and synchronization among a multi-team development environment.

In the solution described herein, system 500 provides a proactive program that can incorporate human oversight and guidance as input. For example, the proactive program can be configured based on the needs of scrum teams and application owners with direct benefit to product owners, technical partners, agility leads, and project execution leads.

Therefore, system 500 is defined and implemented as a product aligned process to ensure consistency, transparency, and end-to-end, comprehensive prioritization of the engineering backlog. The approach described herein provides top-down product accountability and ownership to reduce the current manual effort required by teams by instead providing deliberate guidance on the work necessary to deliver stability, automation, and a risk-based approach to control gap remediation.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for delivering notifications of software deprecations on an external unmanaged cloud environment, the method comprising:
   gathering data, by at least one processor, from one or more data sources hosted on an external unmanaged cloud environment but not serviced by the external unmanaged cloud environment;
   generating, by the at least one processor, a data feed by aggregating the data gathered based on a predetermined criteria;
   streaming, by the at least one processor via a network, the data feed to an internal managed cloud environment;
   storing, by the at least one processor, the data feed in a data store on the internal managed cloud environment;
   joining, by the at least one processor, the data feed with internal application data for at least one internal application on the internal managed cloud environment; and
   creating, by the at least one processor, based on the joined data, a backlog for delivering the notifications.

2. The method of claim 1, wherein the predetermined criteria includes deprecation data comprising a deprecation status indicative of the one or more data sources being unsupported by the external unmanaged cloud environment; and
   wherein the data feed includes at least the deprecation data and one or more attributes to identify the one or more data sources.

3. The method of claim 2, wherein creating the backlog further comprises adding update or upgrade notifications in the backlog to perform an update or upgrade to the one or more data sources having the deprecation status indicative of being unsupported; and
   wherein the update or upgrade is a most recent compatible version of the one or more data sources.

4. The method of claim 3, wherein the joining further comprises executing a JOIN operation to combine data of the data feed stored in the data store with the internal application data based on a Virtual Private Cloud (VPC) attribute identifying a VPC comprising one or more of the data sources on the external unmanaged cloud environment.

5. The method of claim 2, wherein the data feed further includes one or more expiration attributes to identify at least one of:
   an expiration date, the expiration date indicating a date when the one or more data sources are no longer available;
   a software version number associated with the expiration date; and
   a new software version of the one or more data sources at the external unmanaged cloud environment.

6. The method of claim 5, wherein the one or more data sources comprises one or more applications;
   wherein the external unmanaged cloud environment includes a Virtual Private Cloud (VPC) and one or more containers; and
   wherein the VPC is hosting the one or more containers, and the one or more containers are running the one or more applications.

7. The method of claim 6, wherein the data feed further includes additional attributes to identify at least one of:
   the one or more applications;
   the VPC;
   the one or more containers;

an IP address;
a container namespace; and
application dependency, wherein the application dependency includes any data on which the one or more applications depend.

8. The method of claim 7, wherein the joining further comprises executing a JOIN operation to combine data of the data feed stored in the data store with the internal application data based on an VPC attribute identifying the VPC on the external unmanaged cloud environment.

9. The method of claim 8, wherein creating the backlog further comprises adding update or upgrade notifications in the backlog to perform an update or upgrade to the one or more data sources having the deprecation status indicative of being unsupported by the external unmanaged cloud environment;
prioritizing the updating or the upgrading notifications in the backlog; and
wherein the update or the upgrade comprises updating or upgrading at least the application dependency including at least one of a library update, a certificate update and a license update.

10. The method of claim 5, wherein creating the backlog further comprises creating backlog issues in the backlog using an issue tracking software; and
adding update or upgrade notifications in the backlog issues to update or upgrade the one or more data sources having the deprecation status indicative of being unsupported by the external unmanaged cloud environment.

11. A computing device configured to implement an execution of a method for delivering notifications of software deprecations on an external unmanaged cloud environment, the computing device comprising:
a processor;
a memory; and
a communication interface coupled to each of the processor and the memory,
wherein the processor is configured to:
gather data, by a processor, from one or more data sources hosted on an external unmanaged cloud environment but not serviced by the external unmanaged cloud environment;
generate, by the processor, a data feed by aggregating the data gathered based on a predetermined criteria;
stream, by the processor via a network, the data feed to an internal managed cloud environment;
store, by the processor, the data feed in a data store on the internal managed cloud environment;
join, by the processor, the data feed with internal application data for at least one internal application on the internal managed cloud environment; and
create, by the processor, based on the joined data, a backlog for delivering the notifications.

12. The computing device of claim 11, wherein the predetermined criteria includes deprecation data comprising a deprecation status indicative of the one or more data sources being unsupported by the external unmanaged cloud environment; and
wherein the data feed includes at least the deprecation data and one or more attributes to identify the one or more data sources.

13. The computing device of claim 12, wherein the processor is further configured to add update or upgrade notifications in the backlog to perform an update or upgrade to the one or more data sources having the deprecation status indicative of being unsupported; and
wherein the update or upgrade is a most recent compatible version of the one or more data sources.

14. The computing device of claim 13, wherein the processor is further configured to execute a JOIN operation to combine data of the data feed stored in the data store with the internal application data based on a Virtual Private Cloud (VPC) attribute identifying a VPC comprising one or more of the data sources on the external unmanaged cloud environment.

15. The computing device of claim 12, wherein the data feed further includes one or more expiration attributes to identify at least one of:
an expiration date, the expiration date indicating a date when the one or more data sources are no longer available;
a software version number associated with the expiration date; and
a new software version of the one or more data sources at the external unmanaged cloud environment.

16. The computing device of claim 15, wherein the one or more data sources comprises one or more applications;
wherein the external unmanaged cloud environment includes a Virtual Private Cloud (VPC) and one or more containers; and
wherein the VPC is hosting the one or more containers, and the one or more containers are running the one or more applications.

17. The computing device of claim 16, wherein the data feed further includes additional attributes to identify at least one of:
the one or more applications;
the VPC;
the one or more containers;
an IP address;
a container namespace; and
application dependency, wherein the application dependency includes any data on which the one or more applications depend;
wherein the processor is further configured to execute a JOIN operation to combine data of the data feed stored in the data store with the internal application data based on an VPC attribute identifying the VPC on the external unmanaged cloud environment.

18. The computing device of claim 17, wherein the processor is further configured to:
add update or upgrade notifications in the backlog to perform an update or upgrade to the one or more data sources having the deprecation status indicative of being unsupported by the external unmanaged cloud environment;
prioritize the updating or the upgrading notifications in the backlog; and
wherein the update or the upgrade comprises updating or upgrading at least the application dependency including at least one of a library update, a certificate update and a license update.

19. The computing device of claim 15, wherein the processor is further configured to:
create backlog issues in the backlog using an issue tracking software; and
add update or upgrade notifications in the backlog issues to update or upgrade the one or more data sources having the deprecation status indicative of being unsupported by the external unmanaged cloud environment.

20. A tangible computer-readable medium having stored thereon, computer executable instructions that, if executed by a computing device, cause the computing device to perform a method for delivering notifications of software deprecations on an external unmanaged cloud environment, the method comprising:

gathering data, by at least one processor, from one or more data sources hosted on an external unmanaged cloud environment but not serviced by the external unmanaged cloud environment;

generating, by the at least one processor, a data feed by aggregating the data gathered based on a predetermined criteria;

streaming, by the at least one processor via a network, the data feed to an internal managed cloud environment;

storing, by the at least one processor, the data feed in a data store on the internal managed cloud environment;

joining, by the at least one processor, the data feed with internal application data for at least one internal application on the internal managed cloud environment; and creating, by the at least one processor, based on the joined data, a backlog for delivering the notifications.

\* \* \* \* \*